United States Patent
Yokota

(10) Patent No.: US 6,587,787 B1
(45) Date of Patent: Jul. 1, 2003

(54) VEHICLE NAVIGATION SYSTEM APPARATUS AND METHOD PROVIDING ENHANCED INFORMATION REGARDING GEOGRAPHIC ENTITIES

(75) Inventor: Tatsuo Yokota, Torrance, CA (US)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 09/526,023

(22) Filed: Mar. 15, 2000

(51) Int. Cl.[7] .......................... G06F 17/00; G06F 17/30
(52) U.S. Cl. .................... 701/212; 701/208; 340/995
(58) Field of Search ........................... 701/208, 212, 701/201, 206, 214, 209, 211, 213, 217; 340/995, 990, 988

(56) References Cited

U.S. PATENT DOCUMENTS

| | | | | |
|---|---|---|---|---|
| 5,731,978 A | * | 3/1998 | Tamai et al. ............. 364/444.1 |
| 5,893,898 A | * | 4/1999 | Tanimoto .................... 701/201 |
| 5,945,927 A | * | 8/1999 | Nakayama et al. ......... 340/995 |
| 5,946,615 A | * | 8/1999 | Holmes et al. ............. 455/412 |
| 5,968,109 A | * | 10/1999 | Israni et al. ................. 701/208 |
| 5,978,747 A | * | 11/1999 | Craport et al. ............. 702/150 |
| 6,023,223 A | * | 2/2000 | Baxter, Jr. .................. 340/531 |
| 6,073,076 A | * | 6/2000 | Crowley et al. ........... 701/208 |
| 6,092,076 A | * | 7/2000 | McDonough et al. ....... 707/102 |
| 6,107,961 A | * | 8/2000 | Takagi ................... 342/357.13 |
| 6,108,365 A | * | 8/2000 | Rubin et al. ................ 375/130 |
| 6,112,200 A | * | 8/2000 | Livshutz et al. ............... 707/4 |
| 6,122,593 A | * | 9/2000 | Friederich et al. .......... 701/202 |
| 6,141,454 A | * | 10/2000 | Seymour et al. ............ 382/243 |
| 6,161,092 A | * | 12/2000 | Latshaw et al. ............ 704/270 |
| 6,163,749 A | * | 12/2000 | McDonough et al. ....... 701/208 |
| 6,184,823 B1 | * | 2/2001 | Smith et al. ............ 342/357.13 |
| 6,188,956 B1 | * | 2/2001 | Walters ....................... 701/200 |
| 6,192,314 B1 | * | 2/2001 | Khavakh et al. ............ 701/209 |
| 6,262,741 B1 | * | 7/2001 | Davies ........................ 345/425 |
| 6,336,111 B1 | * | 1/2002 | Ashby et al. .................. 707/4 |
| 6,343,290 B1 | * | 1/2002 | Cossins et al. ............... 707/10 |

* cited by examiner

Primary Examiner—Tan Nguyen
Assistant Examiner—Dalena Tran
(74) Attorney, Agent, or Firm—Brinks Hofer Gilson & Lione

(57) ABSTRACT

A vehicle navigation apparatus displays a map on a display screen by using detailed map information. The apparatus displays map information at a plurality of scale, or zoom, levels. The apparatus selectively displays or does not display any given road based on both display scale and the importance, or priority, of the road. The apparatus displays names of municipalities, counties, states, and the like, depending on display scale. The apparatus displays adjacent municipalities, counties, states, and the like in different colors, depending on display scale. The apparatus displays municipalities using generic icons, icons of varying sizes, and icons of varying shapes, depending on municipality size, regional geography, and display scale. The apparatus may display point-of-interest icons in rural areas, depending on regional geography and display scale, and may shift their display locations to accommodate displaying more important information. The apparatus displays roads of relatively lower priority in rural areas, depending on regional geography and display scale, and may display them in a different visual style to distinguish them. The apparatus accepts user input that can affect whether to display names, various icons, and/or roads of various priorities. A method governs the operation of the apparatus.

25 Claims, 11 Drawing Sheets

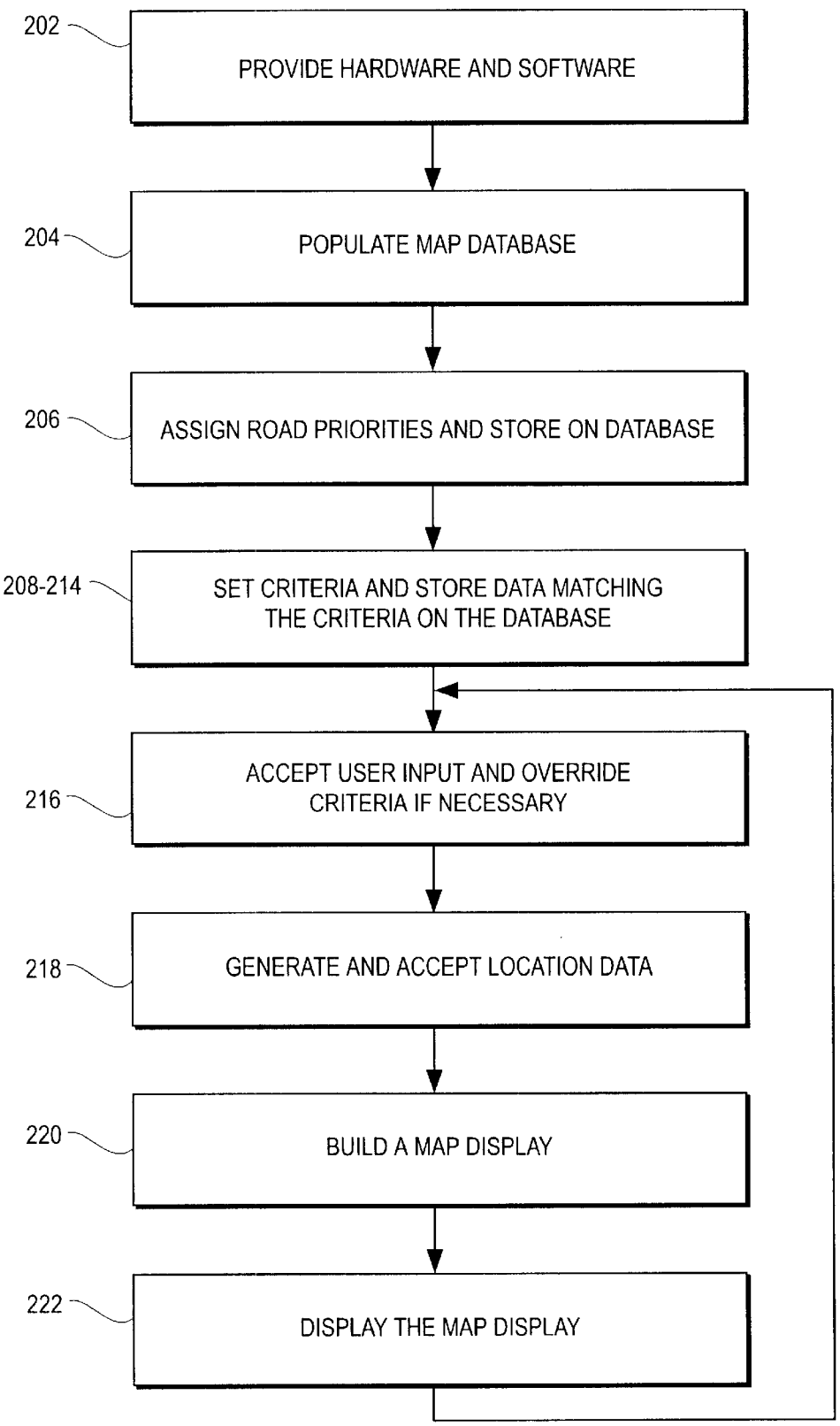

VEHICLE NAVIGATION SYSTEM APPARATUS AND METHOD PROVIDING ENHANCED INFORMATION REGARDING GEOGRAPHIC ENTITIES

BACKGROUND OF THE INVENTION

1. Field of the Invention

The present invention relates generally to vehicle navigation apparatuses and, more particularly, to a vehicle navigation apparatus displaying enhanced information regarding geographic entities, such as the names, sizes, and boundaries of municipalities, counties, and states.

2. Description of the Related Art

A vehicle navigation apparatus of a well-known type performs vehicle travel guidance, enabling a driver to easily drive the vehicle to a desired destination. The navigation apparatus detects the position of the vehicle, reads out map data pertaining to an area in which the vehicle is positioned from, e.g., a CD-ROM (compact disk read-only memory), and displays a map image on a display screen while superimposing a mark representing the position of the vehicle (user's vehicle position mark) on a predetermined portion of the map image. As the present position of the vehicle changes with movement of the vehicle, either the vehicle position mark in the image is moved or the map is scrolled while the vehicle position mark is fixed at a predetermined position, for instance at the center of the image, thereby enabling the driver to recognize the map information of the area at the vehicle position at a glance. This independent movement of the vehicle mark and the map is typically achieved by composing the display from a plurality of layers overlaid on each other, with one layer displaying the vehicle mark, another layer displaying the map, etc. Displays are available at a plurality of scale, or zoom, levels, e.g. large-scale displays for urban areas with comparatively many roads and small-scale displays for rural areas with comparatively few roads. A typical large-scale display might show approximately 1/10 or 5/8 of one square mile, while a typical small-scale display might show 9,000 or 100,000 square miles. Between these two, a typical middle-scale map might show 10 or 160 square miles.

A first problem with currently-available vehicle navigation apparatuses is that they do not display names or boundaries of municipalities, counties, or states, which can lead to a driver's becoming disoriented by not knowing the name of the current or adjacent municipality, county, or state; or, if they do display names of municipalities, counties, or states, these names are displayed in small fonts over the street names, which can lead to crowding of the display and resultant confusion of the user.

A second problem with currently-available navigation apparatuses is that they display all municipalities as uniformly-sized, uniformly-shaped dots when in small-scale or middle-scale mode. This does not tell the driver whether a given municipality is a large metropolitan area or a small town, and does not tell the driver the approximate shape of the municipality's boundaries or road network.

A third problem with currently-available navigation apparatuses is that they do not display point-of-interest (POI) icons in small-scale displays to indicate availability of services that are useful to drivers in rural areas, such as gas stations, restaurants, and lodging.

A fourth problem with currently-available navigation apparatuses is that they do not display enough roads in rural areas when in small-scale mode. The apparatuses typically assign a "priority," or importance, to each road, and display only roads at or above a certain predetermined priority to avoid over-crowding a small-scale display. For instance, displaying an interstate highway is considered to be more useful to a driver than is displaying a two-lane county road, so the interstate highway is assigned a higher priority and is more likely to be displayed. This is important in urban areas that have a high density of roads. In small-scale displays of rural areas, though, where many of the roads are sparsely situated and of low priority, the apparatuses tend to display too few roads, because the low density of the existing roads is exacerbated by the roads' priorities being below the predetermined level for display.

BRIEF SUMMARY

Therefore, it is a first object of the present invention to display names of municipalities, counties, and/or states, depending on scale; to do so in such a manner that state names can be easily distinguished from municipality and/or county names; and to do so in such a manner that municipality, county, and state names can be easily distinguished from street names.

It is a second object of the present invention to use different colors to display adjacent municipalities, counties, and states, depending on scale.

It is a third object of the present invention to use icons of varying sizes to represent municipalities on small-scale displays, the size of each icon being dependent on the size of the municipality it represents.

It is a fourth object of the present invention to use icons of varying shapes to represent municipalities on small-scale displays, the shape of each icon being dependent on the shape of the boundaries of the municipality it represents.

It is a fifth object of the present invention to use street network outlines to represent municipalities on small-scale displays, the shape of each street network outline being dependent on the shape of the street network of the municipality it represents.

It is a sixth object of the present invention to use fixed-size icons of one or more colors and/or design patterns to represent municipalities on small-scale displays, the colors and/or design patterns being dependent on the size and/or importance of the municipality it represents.

It is a seventh object of the present invention to display point-of-interest icons on small-scale displays of rural areas to indicate availability of services that are useful to drivers, such as gas stations, restaurants, and lodging.

It is an eighth object of the present invention to display roads of relatively lower priority on small-scale displays of rural areas, the adjustment of priorities being dependent on the density of the road network in the surrounding area.

It is a ninth object of the present invention to provide defaults for each of the displays described in the first eight objects, but also to provide means for user input to affect the display of each of the first eight objects.

According to the present invention, the first object is achieved by storing the names of geographic areas (e.g. municipalities, counties, states, ZIP code zones, telephone area codes, and the like) in a map database, and displaying the names of municipalities, counties, and/or states depending on display scale and display criteria. Preferably, state names are visually distinguishable from municipality and county names when displayed. A preferred method of making the displayed names visually distinct is displaying state names entirely in upper-case letters and displaying municipality and county names in mixed-case, i.e. upper-case mixed with lower-case, letters. A preferred method of distinguishing place names from street names is to display the place names in a layer, a size, a typeface, a style, and/or a color that are distinct from the street name display. Text orientation also helps distinguish place names from street names, as place names remain horizontal while street names follow angles of roads.

According to the present invention, the second object is achieved by storing information regarding the boundaries of geographic areas (e.g. municipalities, counties, states, ZIP Code zones, telephone area codes, and the like) in the map database; assigning colors to areas such that no adjacent geographic areas are assigned the same color; and displaying the colors for cities, counties, states, and/or other geographic areas on the portion of the display representing the particular geographic area, depending on display scale and display criteria.

According to the present invention, the third through fifth objects are achieved by storing the sizes of municipalities in the map database; storing a boundary shape for each municipality above a first predetermined size in the map database; storing the street network outline for each municipality above a second predetermined size in the map database; and displaying an icon representing the size, shape, and/or street network outline for each municipality depending on municipality size and display scale.

According to the present invention, the sixth object is achieved by identifying municipalities of applicable sizes and situations (relative importance within the region) in the map database; storing an icon for each applicable municipality; and displaying an icon representing the municipality, depending on the display scale, municipality size, and situation.

According to the present invention, the seventh object is achieved by identifying locales of applicable sizes and situations (relative importance within the region) in the map database; storing an icon for each type, and/or for all types combined, of predetermined services available within the locale; and displaying an icon representing the locale where a service or services are available, depending on the display scale and situation.

According to the present invention, the eighth object is achieved by evaluating the density of roads in an area, and adjusting the priority screening data to select lower-priority roads to be displayed on small-scale displays of rural areas.

According to the present invention, the ninth object is achieved by providing default displays for each of the first eight objects; providing a physical user input device or remote controller; and using input from the remote controller to override the default displays.

BRIEF DESCRIPTION OF THE DRAWINGS

FIG. 10 is a flowchart of a method in accordance with the invention hereof; and

DETAILED DESCRIPTION OF THE PREFERRED EMBODIMENTS

1. System Configuration

Figure 1:
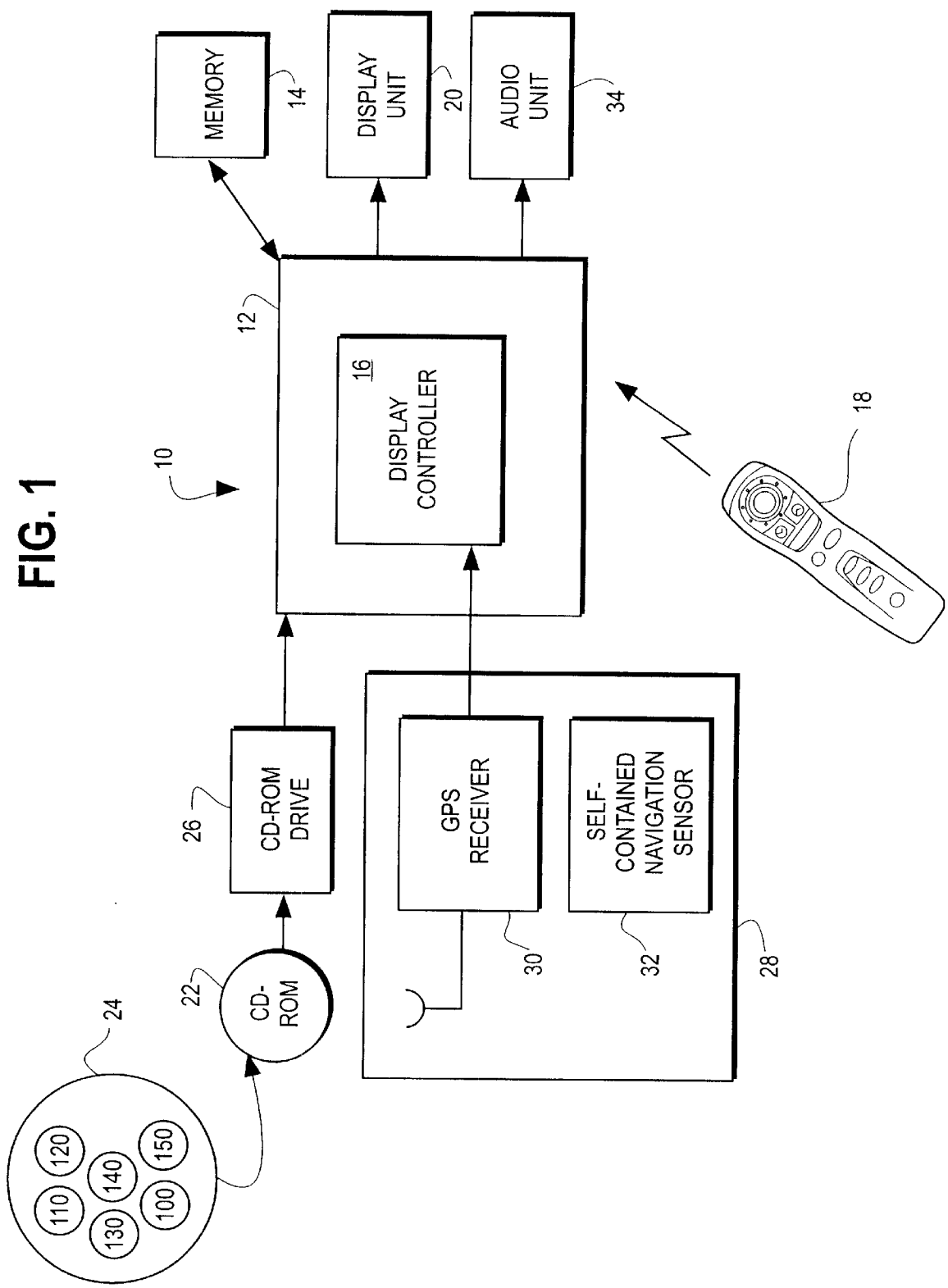
FIG. 1 is a diagram of a navigation system in accordance with the present invention.

FIG. 1 shows a navigation system 10 in accordance with the present invention. The navigation system 10 comprises a microprocessor 12; an associated memory 14; a display controller 16; an operating unit or remote controller or user input device 18 for accepting input from a user of the system; a display unit 20 for displaying a map display; a compact disk read-only memory (CD-ROM) 22 for storing map data; a map database 24 on the CD-ROM 22; a CD-ROM drive 26 to read the map data 24 on the CD-ROM 22; and a location system 28. The location system 28 comprises either a Global Positioning System (GPS) receiver 30, a self-contained navigation sensor 32, or both. Each of these elements is described below. Optionally, an audio unit 34 may also be used.

Rather than the CD-ROM 22 and the CD-ROM drive 26, a DVD, a hard disk, a non-volatile memory chip, and other like storage devices, and readers for same, can also be used advantageously in the present invention.

2. Map Data

The map database 24 stored on the CD-ROM 22 comprises at least a geo-feature polygon table 100 and a road data table 150, as described below.

The geo-feature polygon table 100 comprises information on geographic features, such as lakes, malls, parks, and the like; the information comprises such fields as size, shape, location, and name. The geo-feature polygon table 100 may further comprise data on large geographic areas, such as countries, states, and counties; alternatively, these may be in a separate state and urban area polygon table 110, as described below. The geo-feature table 100 may further comprise state and/or urban area polygons and urban area names, i.e. polygons that are generally in the shape of a state and/or an urban area, such as a large city, and the names thereof; alternatively, these may be in the state and urban area polygon table 110 and/or a separate state and urban area name table 120, as described below.

The state and urban area polygon table 110 comprises information fields used in displaying large geographic areas, such as countries, states, counties, urban areas, and the like, in the vehicle navigation system hereof, such as: display type, e.g. meshed polygon, solid polygon, icon, dot, etc.; color, e.g. a unique color for each municipality such that no adjacent municipalities have the same color, else a single color for all municipalities; color fill position, i.e. a point within the polygon at which to start filling in with color; shape, e.g. a pointer to a geometry table of either absolute coordinates or coordinates relative to a representative position; pattern, e.g. solid fill, preset hatch patterns, or an icon design ID; geographic size of the urban area; population of the urban area; display size, e.g. a size factor for the icon or other display that is generally proportional to the geographic size or population of the urban area; road network pattern, e.g. a pointer to an appropriate entry in the major road geometry table; entity type, e.g. country, state, county, city, community, zip code area, etc.; availability of predetermined services in the entity, and icons for same; and priority, e.g. applicable map scales on which to display the particular entity, detail level for user preference setting, overlap priority, etc.

The state and urban area name table 120 comprises information fields used in displaying smaller geographic areas, such as urban areas, cities, communities, ZIP code zones, telephone area codes, statistical areas, census tracts, and the like, in the vehicle navigation system hereof, such as: label position; name string; font size, e.g. small, large, or size value; and font style, e.g. typeface, capitalization, Roman, Italic, bold, etc. Alternatively, these information fields may be contained in the state and urban area polygon table 110.

A city polygon table 130 contains a subset of the information fields in the state and urban area polygon table 110, and is preferably used for large-scale maps. Information fields in the city polygon table 130 include position, shape, color, entity type, priority, and name, all as described above. A city name table 140, used in conjunction with the city polygon table 130, contains the same information fields as does the state and urban area name table 120. Alternatively, the information fields in the city name table 140 may be incorporated into the city polygon table 130.

The road table 150 comprises information fields used in displaying roads in the vehicle navigation system hereof, such as: location, e.g. state, county, and/or city name; street name strings, e.g. name of the road, route number, and/or aliases; address number range; street class, e.g. freeway, highway, local, ramp, ferry route, etc.; street type, e.g. divided or undivided, paved or unpaved, etc.; speed limit; number of lanes; supplemental attributes, e.g. width, existence of bike route and/or sidewalk, etc.; shape, e.g. geometry, length, etc; connectivity, e.g. links to other street segments, turn restrictions, one-way or two-way, etc.; traffic controls, e.g. stop signs, traffic signals, railroad crossings, drawbridges, etc.; conditions, e.g. public or private or restricted, under construction, seasonal closure, etc.; limitations, e.g. height clearance, weight restrictions, carpool lane, slope grade, etc.; sign text, e.g. destinations, distances, directions, etc., e.g. "I-5 N to San Francisco"; and priority, which is a combination of all or most of the above-described road data table information fields.

Road data may be contained in a single road data table 150, or separate road data tables may be used for each separate field or group of fields described above. If multiple tables are used, they are linked to each other in the well-known manner. Further, one or more separate road data tables may be used for each map scale, to improve efficiency of data retrieval for display. A supplemental set of road data tables may be used for user preference upgrading situations, as described below, again for efficiency of data retrieval for display.

Designing the above-described tables 100, 110, 120, 130, 140, 150 is well within the skill of those of ordinary skill in the art, given the descriptions of data fields herein. In the interest of brevity, therefore, details of table designs are not given herein.

3. Remote Controller

Figure 2:
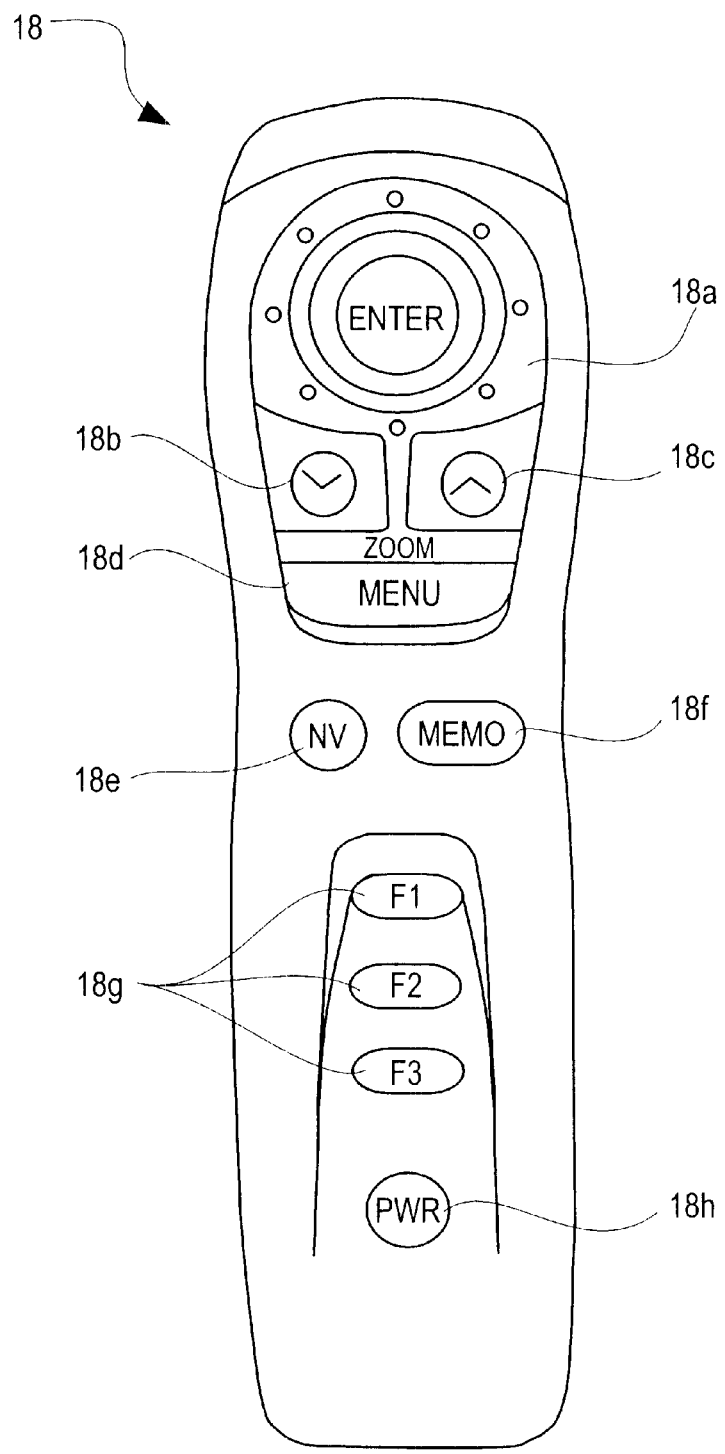
FIG. 2 is a diagram of the remote controller of FIG. 1.

The remote controller 18 used in the present invention can be of any type familiar to those of ordinary skill in the art. One such remote controller 18 is shown in FIG. 2. A joystick controller 18*a* is operated to move a cursor (focus), a vehicle mark, or the like relative to a map, or to select a desired menu item by moving a menu selecting bar in vertical and/or horizontal directions, and is depressed to select a menu item. An enlargement key 18*b* is operated to increase the scale of a displayed map, i.e. to "zoom in" on a displayed area to show more detailed information, albeit of a smaller area. A reduction key 18*c* is operated to decrease the scale of a displayed map, i.e. to "zoom out" on a displayed area to show a larger area, albeit with fewer details. A menu key 18*d* is operated to display a menu. A navigation key 18*e* is operated to display a map containing a point corresponding to the user's vehicle position along with the user's vehicle position mark. A memory key 18*f* is operated to store a desired point. Functions frequently used are set on function keys 18*g*; the function keys are operated to select the set functions. The power key 18*h* is operated to power on and power off the display unit 20.

4. Location System

In order to display a map of where a vehicle is located in the context of its surroundings, the navigation system hereof must know where the vehicle is actually located at any given time. Two methods of locating vehicles are by receiving Global Positioning System (GPS) data via the GPS receiver 30, and by calculating a change in position of the vehicle since a previous GPS reading via the self-contained navigation sensor 32. Both of these methods, and the associated devices and software, are described in U.S. Pat. No. 5,852,791, the disclosure of which is hereby incorporated by reference. By using either or both of these methods and devices, an accurate current position of the vehicle is constantly being input to the display controller 16.

5. Display Unit, Display Controller, Compilation of the Map Database, and Creating the Display The display unit 20 is of any well-known type, and is controlled by the display controller 16. The display unit 20 is generally of a size and shape adapted to fit into a dashboard of an automobile or other vehicle for ready viewing by a driver of the vehicle.

The display controller 16 comprises computer software on the microprocessor 12. Default values for several variables are stored in the memory 14, the variables including: map scale, e.g. display a small-scale or a large-scale map; desired color usage, e.g. use distinct colors to display distinct areas or display everything monochromatically; icon shape, e.g. display urban areas by boundary shape icons, road network mesh icons, generic icons, or smaller or larger dots; name location, e.g. embed area names in maps so the names move with the maps or have the names float above the maps so the maps move independently of the names; name appearance for each type of geographic area (countries, states, counties, cities, towns, and the like), the appearance characteristics including typeface, roman or italic, all capital letters or mixed case letters, and embossed or plain letters; at least one size threshold; and at least one road priority level.

Road priority level is a function of road type and road upgrade criteria. Ideally, the road priority levels are set in such a way as to avoid extreme densities of display in both urban and rural areas; however, precise assessment of regional road density requires a large amount of computing when the road database is compiled. It is thus more practical, though cruder, to base road priority levels on the characterization of the area as urban or rural as a substitute, until significantly increased computational capabilities are realized and become readily available.

The display controller 16 uses the size thresholds to determine what to display on a given map display for a given urban area. For instance, if the population of a city exceeds a size threshold, a proportionately sized road network mesh might be displayed, while if the population is less than the size threshold only a generic dot might be displayed. Preferably, there is at least one size threshold for each map scale level.

A sample set of display priorities for which polygons and name labels to display is given in Table 1:

TABLE 1

| Level of Detail | Small-Scale Map | Medium-Scale Map | Large-Scale Map |
| --- | --- | --- | --- |
| Off | None | None | None |
| Coarse (polygon) (label) | States | Counties States | Cities/rural counties — |
| Medium (polygon) (label) | States Large counties | Counties Large cities | Cities/rural counties Large communities |
| Detailed (polygon) (label) | States Counties | Counties Cities | Cities/rural counties Communities |

In Table 1, the upper row of each of the sets of rows labeled Coarse, Medium, and Detailed refers to displays of base polygons and/or name labels, while the bottom row of each of these sets of rows refers to displays of name labels only.

Regarding the references to states in Table 1: Small-scale maps should display state polygons and state name labels. In medium-scale maps, state name labels may appear if few cities can be labeled in an area. For smaller states, such as those in New England, state name labels may be sufficient to identify the geographic area without county polygons or county name labels, i.e. county names and county polygons may be omitted.

Regarding the references to counties in Table 1: Because many county names are not widely recognized by visitors, county polygons and county name labels may or may not be used, depending on the user preference setting and/or the geography of the region. When county polygons are not in use, city polygons may be used as a substitute. County polygons with representative city name labels may also be used if the city is better known and the city and county are close to co-extensive. For instance, Greater Miami is co-extensive with Dade County; Miami is better-known than Dade, so the county may be identified as Miami in the display.

Regarding the references to rural counties in Table 1: Unincorporated regions outside the labeled urban areas may display a county name as a substitute for a city name, with or without the color-coded polygon. This excludes small areas of unincorporated communities within an urban area.

Regarding the references to communities in Table 1: Geographic areas with definite boundaries, such as ZIP code, telephone area code, electoral district, statistical area, etc., may be displayed with the color-coded base polygons when appropriate, depending of course on the availability of data and user preference. "Vanity cities" such as Hollywood, municipalities, and any other districts that may not have clearly defined boundaries may be indicated with approximate boundaries or only by name without the color-coded base polygons, again as set by user preference. Community names and/or boundary information may be turned on or off independently of the detail level setting described in Table 1.

Regarding the references to large counties, cities, and communities in Table 1: Certain select names may be displayed if significant for identification purposes. The extent of the geographic area that the name represents may have to be sufficiently large at a given map scale to display the label.

Figure 3:
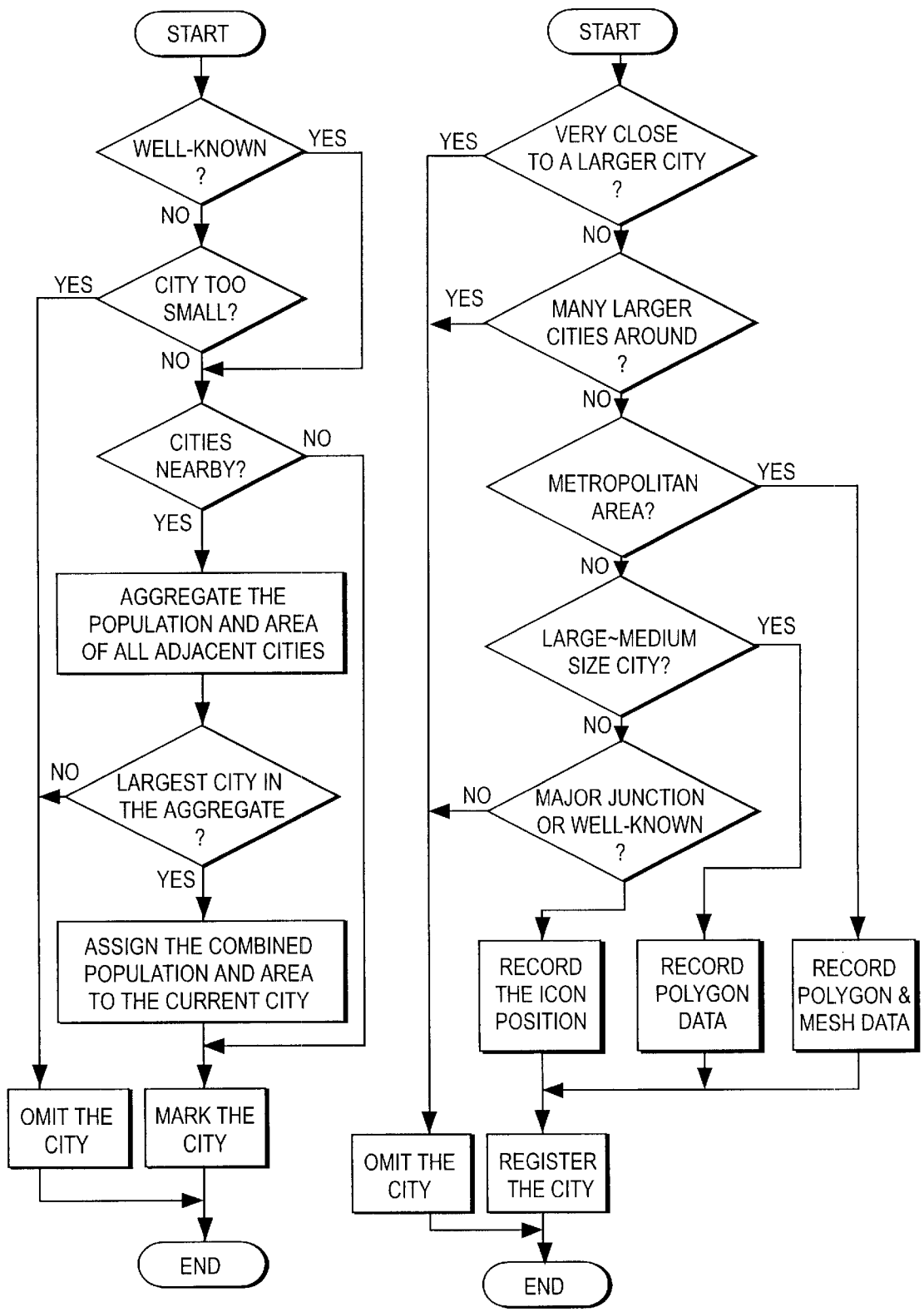
FIG. 3 is flowcharts of the city aggregation process and the city classification process.
Figure 4B:
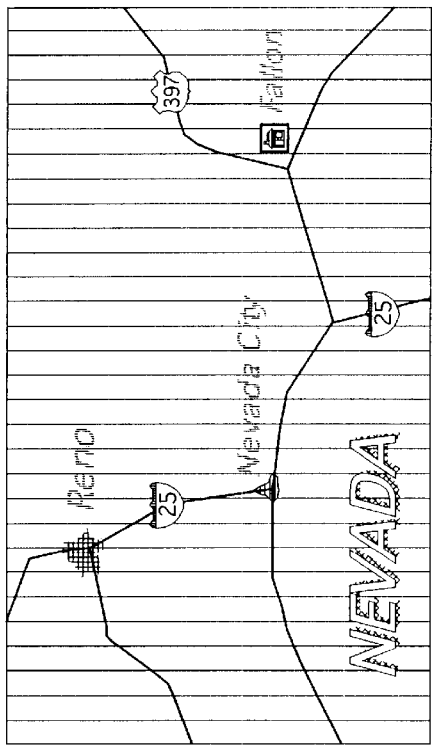
FIG. 4 is four views of map displays made using the invention hereof.
Figure 4D:
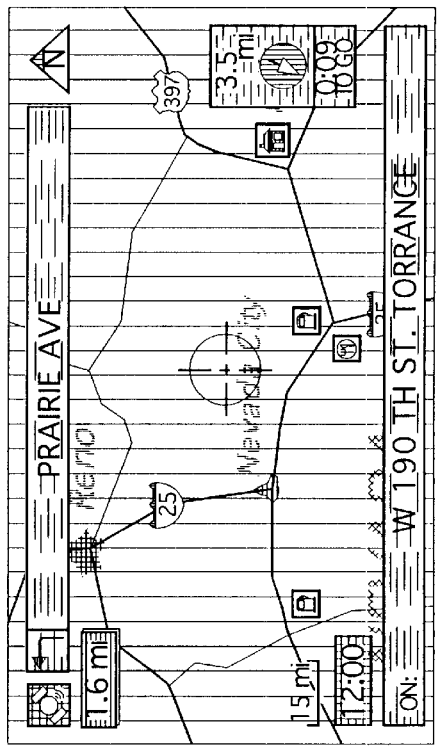
Figure 4A:
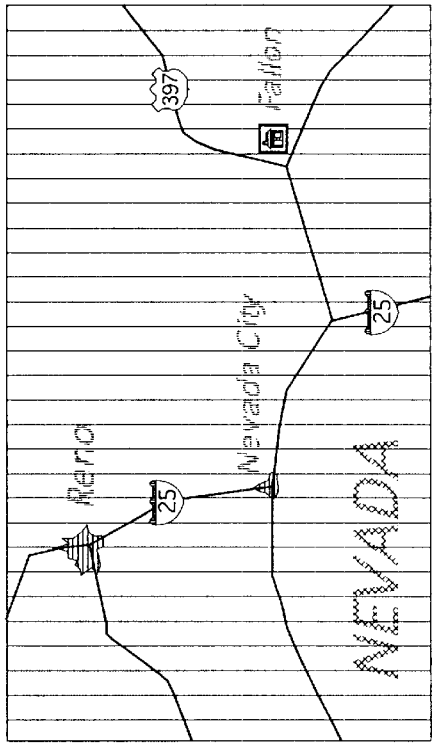
Figure 4C:
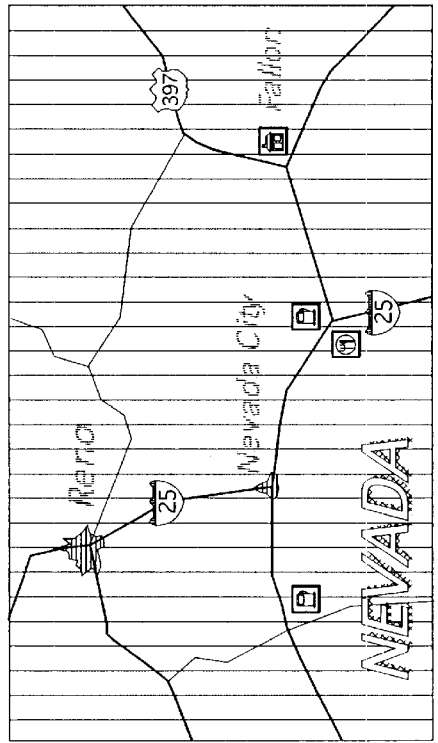

A sample flowchart for classifying urban areas is shown in FIG. 3. In a first step, each city in the raw database is aggregated. In the aggregation process, each city is compared with surrounding cities and a decision is made as to whether to display them as one combined metropolitan area or to display them separately. In a second step, each aggregated city is classified as to its being large, medium, or small; if small, whether it is located at the junction of important roads or not; etc. The actual flow or criteria may be modified due to target customer preference, regional geography, data availability, and/or purpose of the map display. The actual implementation may include certain exception handling, such as twin-city names.

A sample set of priorities for how to display cities with mesh (road networks), polygons, or generic icons is given in Table 2:

TABLE 2

| User Preference | Mesh Setting | Polygon Setting | Icon Setting |
| --- | --- | --- | --- |
| Off | Shown as polygon* | No polygons/icons | No icons |
| On | Large metro areas | Large/medium cities | Smaller cities |

*If the Polygon Setting is off, no mesh or polygon may appear. If the Polygon Setting is on, the polygon representation is used.

Examples of some of these settings are shown in FIG. 4.

In Table 2, cities are classified into three size groupings:

Large metropolitan areas have an aggregate population of at least 500,000 to 1,000,000, for example, when aggregated over an entire metropolitan area. The name of the most prominent city in the metropolitan area should be displayed. Other, surrounding cities are displayed as listed below.

Large-to-medium size cities exceed a population threshold of 50,000 to 200,000, for example, if not part of a large metropolitan area. These may be omitted if near (e.g. within ⅛ screen width) a metropolitan area or another city that has two to three times the population, or if more than three to eight cities of larger population exist in the proximity (e.g. within less than ½ the screen width).

Smaller cities have minimum populations of 1,000 to 20,000, for example, and are located at important highway junctions, if the above criteria other than population are met. Regardless of the criteria, certain well-known places, such as the Grand Canyon, should receive priorities over other cities. These well-known places may be indicated by a different icon.

The urban area mesh representation referred to in Table 2 may use a preset hatched pattern to imitate the road network of the metropolitan area in question. The shape of the urban area polygon for the particular metropolitan area determines the shape of the meshed area. While the rendering may not be precise, this scheme requires minimal or only minor additional processing, with no additional data for the mesh patterns.

Alternatively, the mesh may be based on the actual geometry of a few major roads in the urban area, in order to more accurately represent the city. The selection process may require significant compilation time to achieve appropriate density of the map for a given map scale. The mesh data may be separate for each map scale, or a combined table where each road selected contains an appropriate map scale. No additional display function may be necessary, since the mesh can be treated as the regular road segments.

The display controller 16 uses the road priority levels to determine the appropriate set of roads to display on a given map display. For instance, a default road priority level might be to display only interstate highways and roads at exits from interstate highways on very small-scale map displays. Preferably, there is at least one road priority level for each map scale level.

A sample set of road priority levels, i.e. when to display certain roads, is given in Table 3:

TABLE 3

| | Scale | | | | |
|---|---|---|---|---|---|
| | Smallest | Small | Medium | Large | Largest |
| Interstate | Shown | Shown | Shown | Shown | Shown |
| Major Hwys | Upgradable | Shown | Shown | Shown | Shown |
| Minor Hwys | Omitted | Upgradable | Shown | Shown | Shown |
| Major Roads | Omitted | Omitted | Upgradable | Shown | Shown |
| Minor Roads | Omitted | Omitted | Omitted | Upgradable | Shown |

Regarding road display upgrades: Lower-level roads may be displayed in a rural map at smaller scales than would be allowed in a city area, because of the lower density of roads in rural areas, although local variances are allowed in both rural and urban areas. This flexibility permits more details in sparsely-covered areas while avoiding excessive rendition of streets in city areas at the same map scale. To maintain a degree of consistency throughout the entire map, the upgrading should be limited to one or two map scale levels. The upgraded road may be displayed with a slightly adjusted color (e.g. lighter) and/or a line style (e.g. dotted) to indicate its lower priority. Identification of upgradable roads may include the following criteria: (1) not many roads are shown at the map scale of concern, e.g. within a radius of half the screen width fewer than twenty road segments appear, or the aggregate length of visible roads is shorter than four times the screen width; (2) any road that does not belong to a city (i.e., the road is associated with a county name only; this takes much less calculation to determine than does the previous criterion) may qualify for further consideration; (3) the road is at a slightly lower level than allowed in the map scale of concern; (4) the road is connected to a visible road, i.e. either a higher-level or an upgraded road; (5) the road has a sufficient total length, e.g. longer than ¼ of the screen width at the map scale; (6) the road does not have a sufficient total length, but is an important connector linking two higher-level roads, e.g. is shorter than ¼–½ the distance of the shortest alternative route; and (7) no parallel road of a higher level exists in the proximity, e.g. within 1/8 of the screen width.

Figure 5:
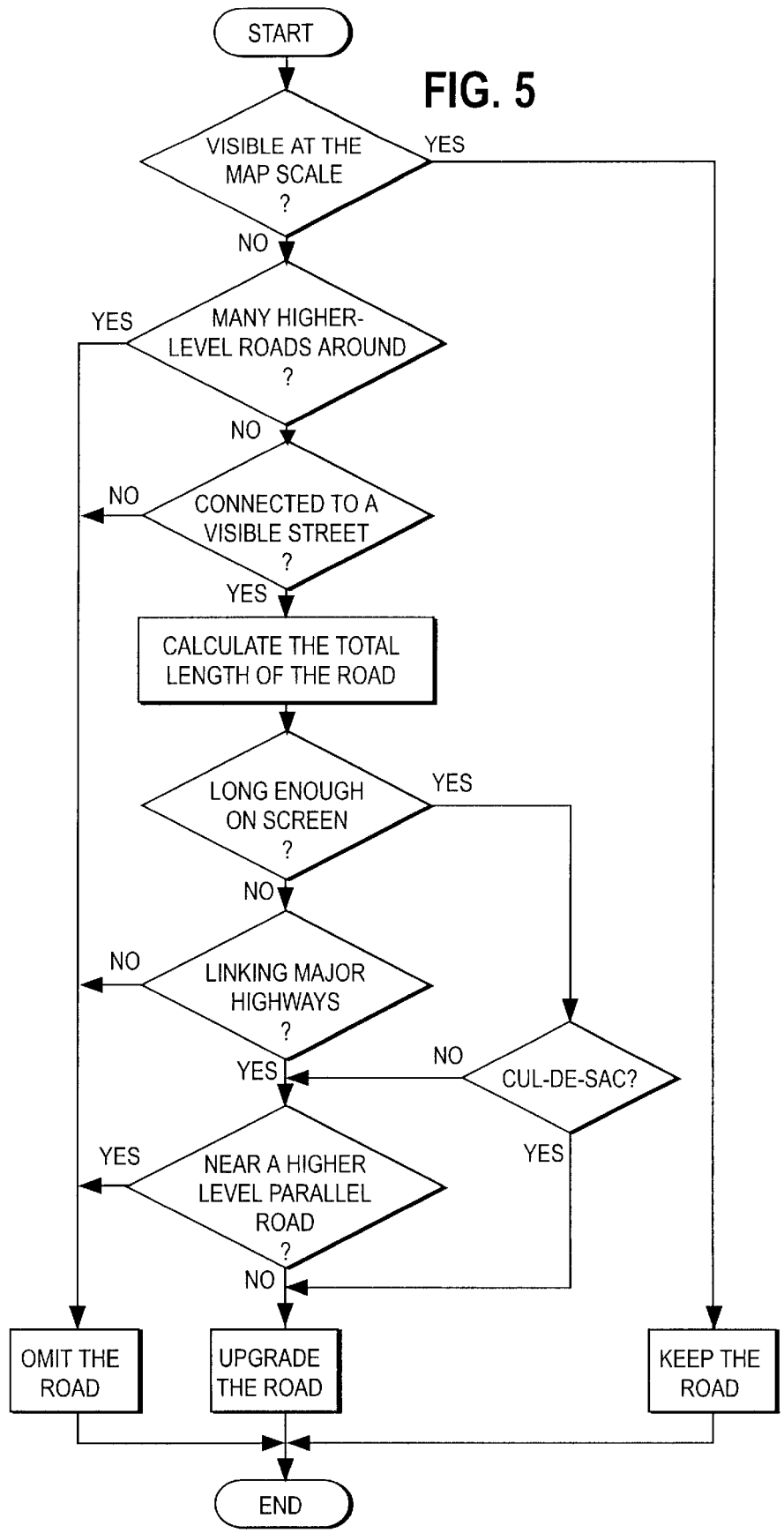
FIG. 5 is a flowchart of the road display decision process.
Figure 6A:
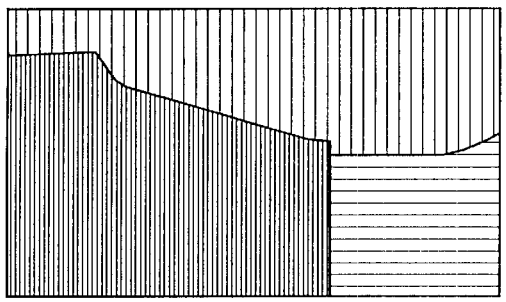
FIG. 6 is eight views of partial map displays made using the invention hereof, each of the eight views showing a distinct overlay layer.
Figure 6E:
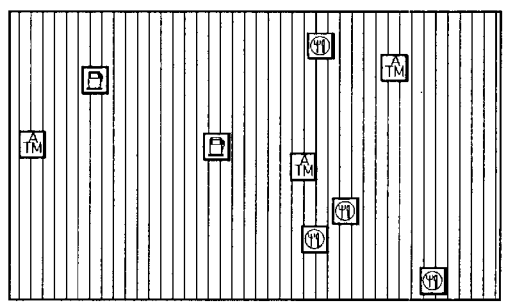
Figure 6B:
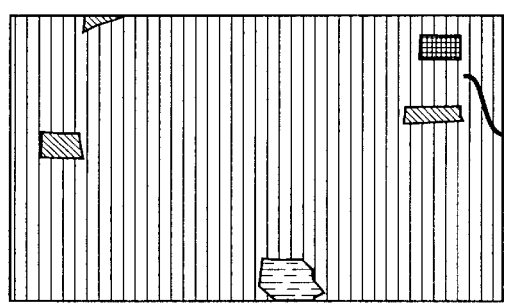
Figure 6F:
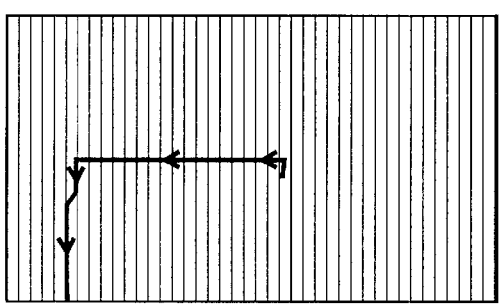
Figure 6C:
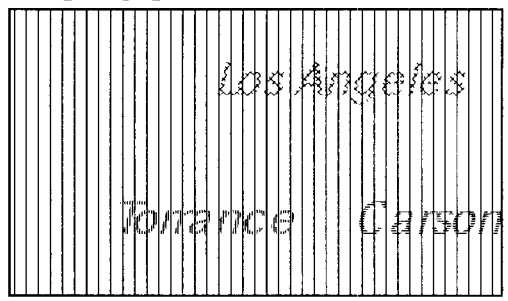
Figure 6G:
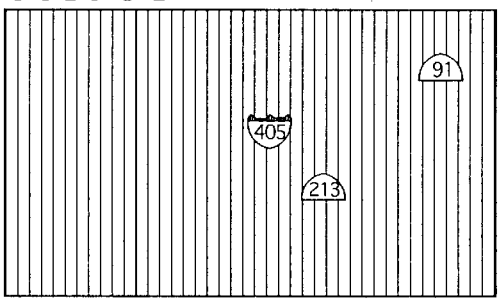
Figure 6D:
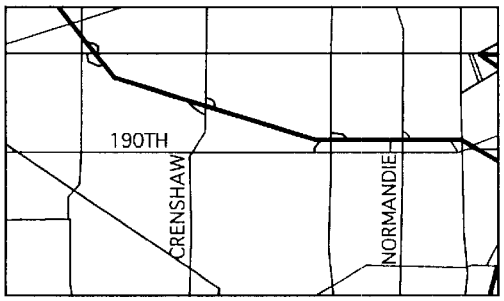
Figure 6H:
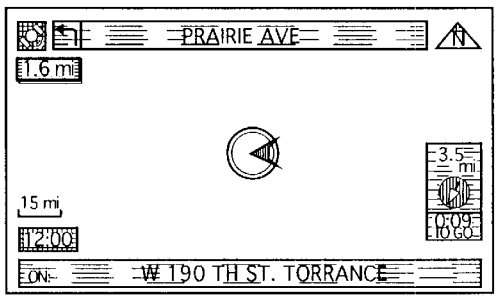
Figure 7A:
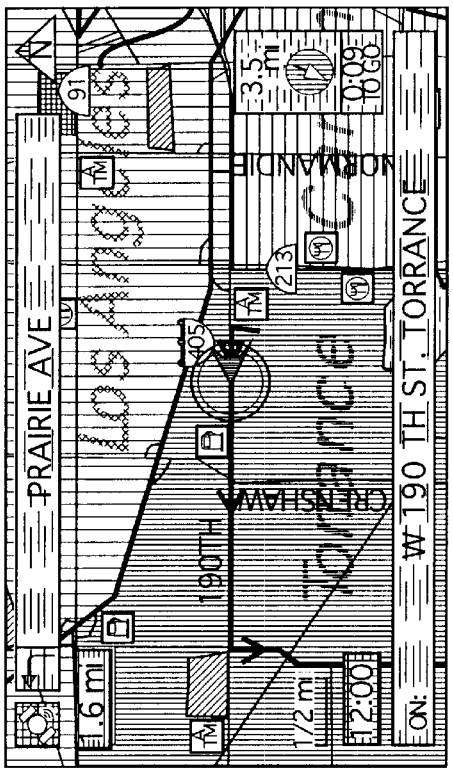
FIG. 7 is four views of map displays made using the invention hereof, with the overlay layers of FIG. 6 overlaid on each other.
Figure 7B:
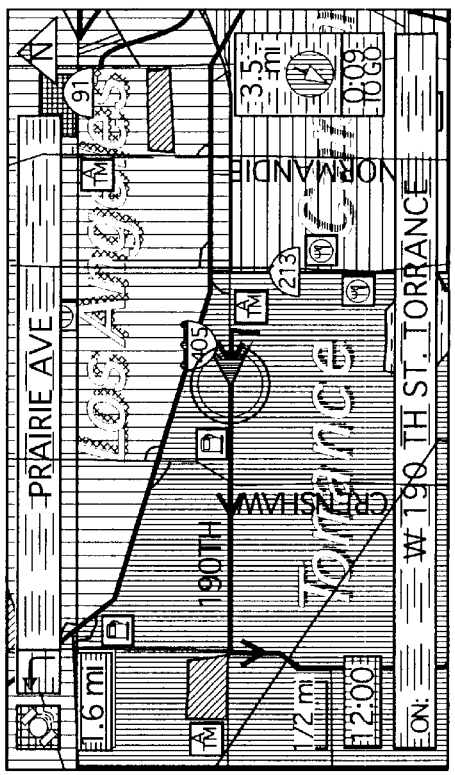
Figure 7C:
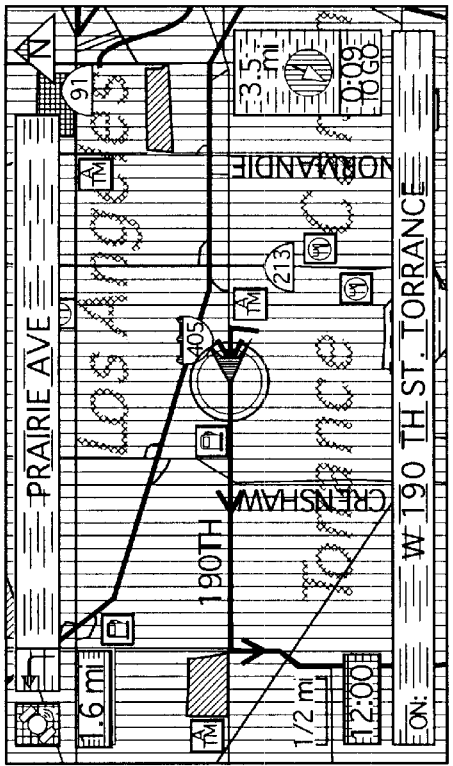
Figure 7D:
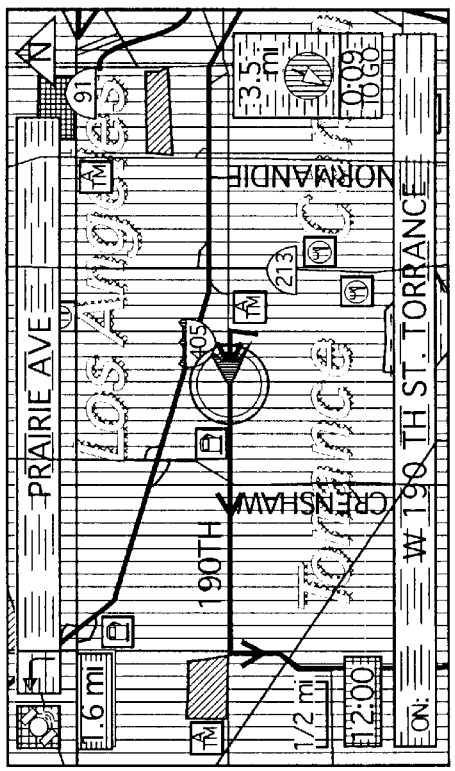
Figure 8A:
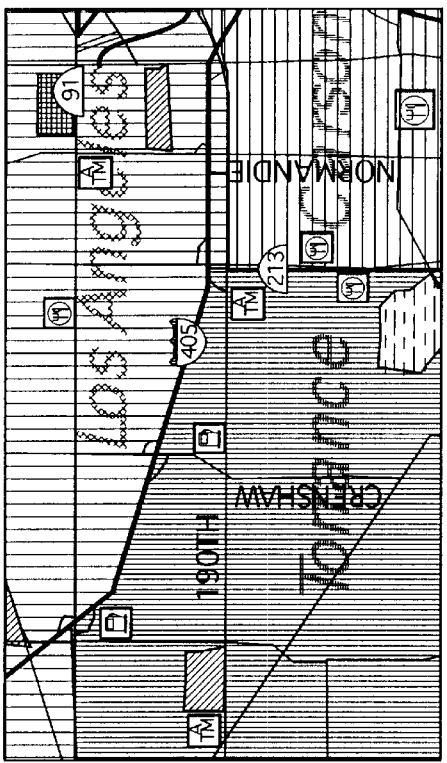
FIG. 8 is four views of map displays made using the invention hereof, with the overlay layers of FIG. 6 overlaid on each other.
Figure 8B:
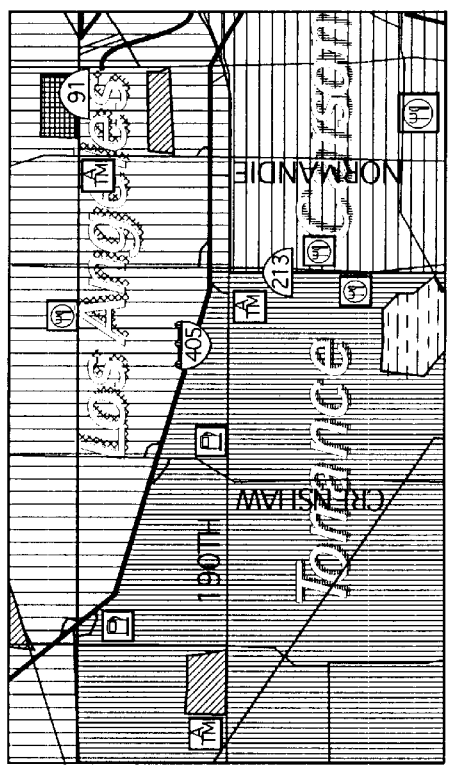
Figure 8C:
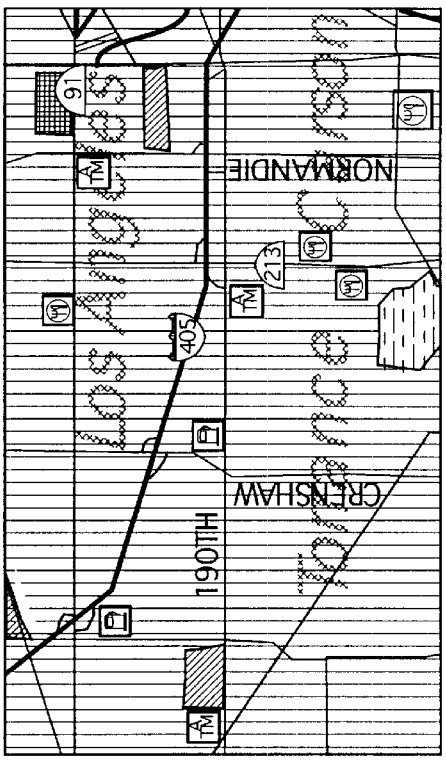
Figure 8D:
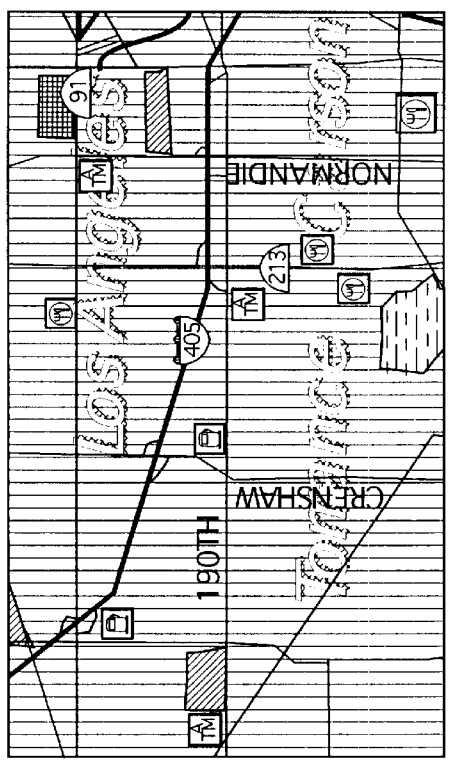
Figure 9A:
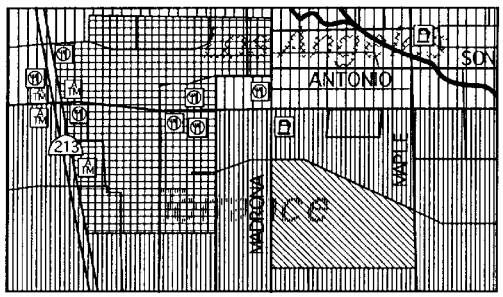
FIG. 9 is eight views of map displays made using the invention hereof, the eight views showing distinct color display schemes for city names.
Figure 9B:
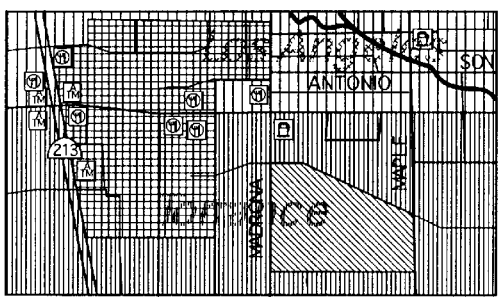
Figure 9C:
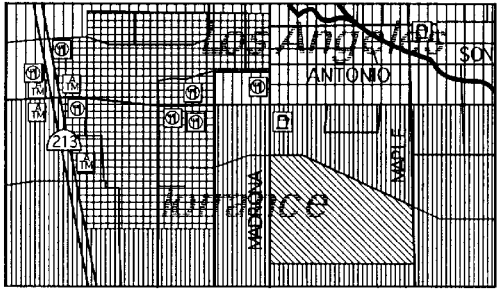
Figure 9D:
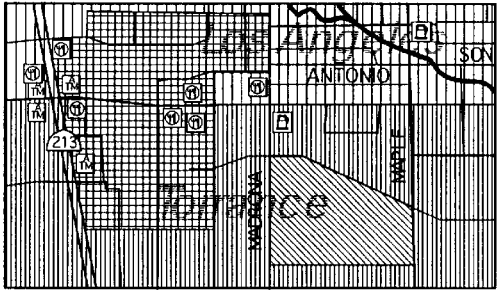
Figure 9E:
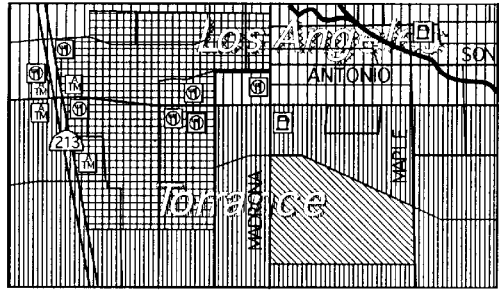
Figure 9F:
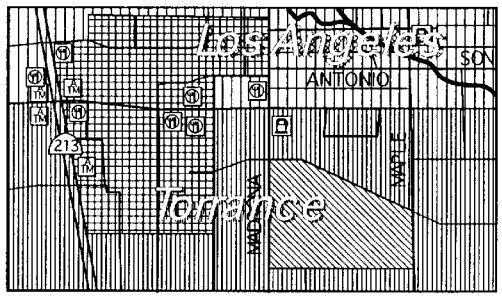
Figure 9G:
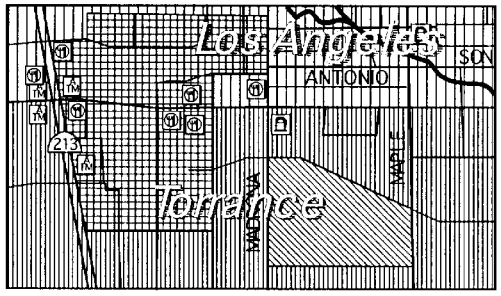
Figure 9H:
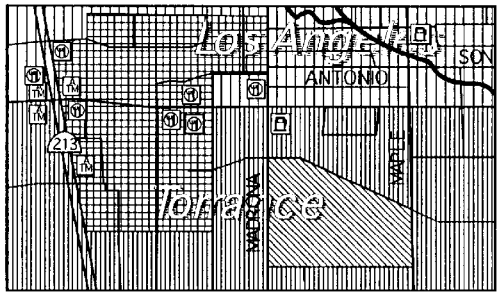

An example of upgrading rural roads is shown in FIG. 4, in which views a) and b) show a rural area before road upgrading and views c) and d) show the same rural area after road upgrading. A sample flowchart of the decision-making process to upgrade the display of rural roads is shown in FIG. 5. The upgrading process may be varied based on target customer preference, data availability, regional geography, and/or purpose of the map display. The actual implementation may include additional considerations, such as street classifications and city locations.

Figure 11:
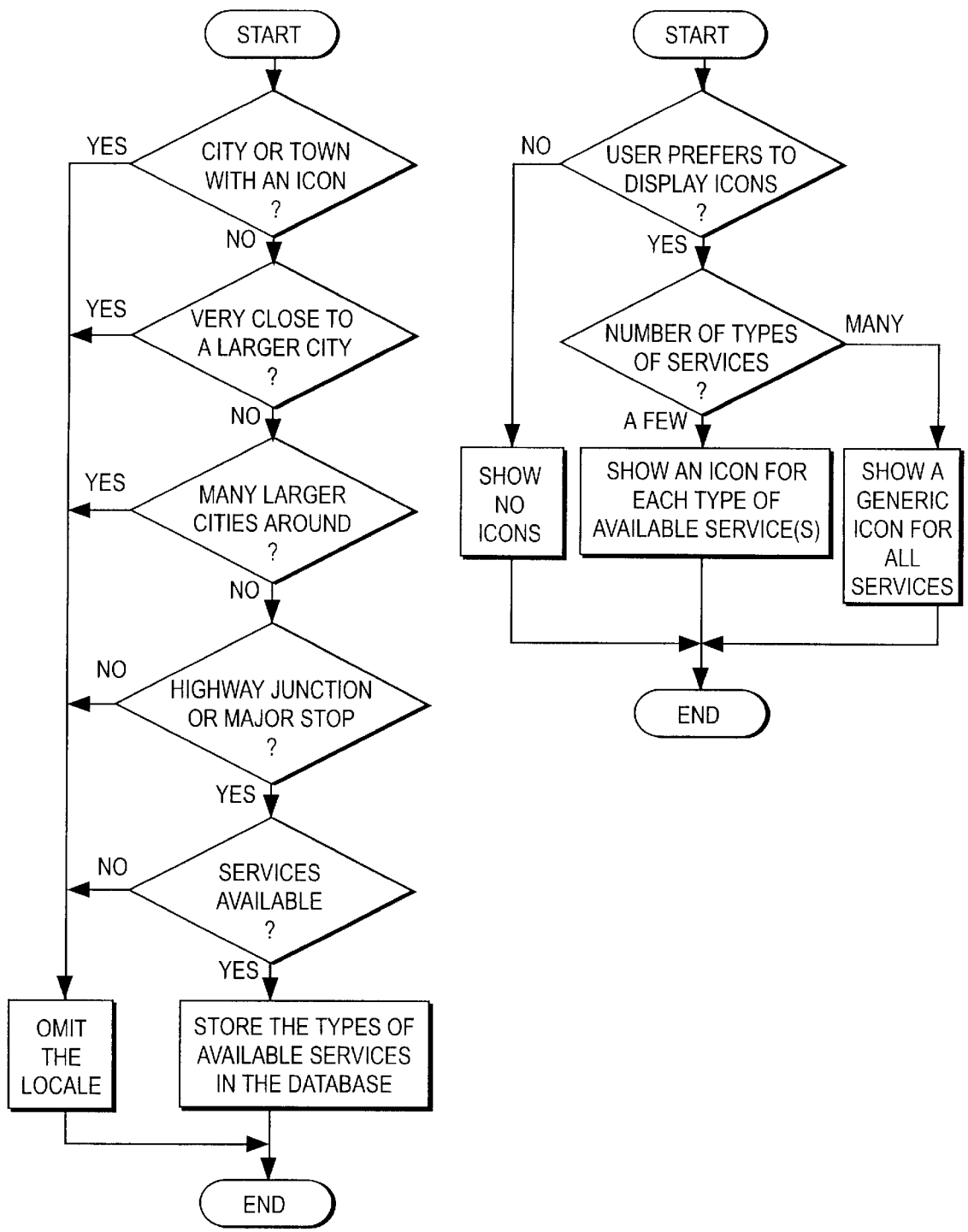
FIG. 11 is two flowcharts regarding the point of interest display process.

Similarly, point-of-interest icons, or service icons, for certain basic services that are useful to the driver, such as gas stations, restaurants, and lodging, can also be upgraded to appear on a map at a scale that would otherwise hide such icons, as shown in views c) and d) of FIG. 4. Such upgraded service icons preferably represent a municipality, or a non-municipal locale along a highway, in which such basic services are available. The decision-making process for identifying and displaying, or rendering, point-of-interest icons is shown in FIG. 11. While regular point-of-interest icons are typically limited to the largest map scales to avoid overcrowding in urban areas, upgraded point-of-interest icons can appear in any map scale as long as the mapped area remains relatively sparse. Each type of service may be identified with a distinct icon design, or a number of types of services may share a single icon design.

Point-of-interest icons might not necessarily be located at the exact point of availability, for at least two reasons: first, to avoid overlapping other information, such as roads and road names, that are more important, and second, to avoid clutter. Because service icons are preferably used to identify locales that have available predetermined services, the precise locations within those locales where the services are available are not as important. Also, especially in smaller map scales, a single icon may represent the availability of two or more services of one or more types to avoid overcrowding, in which case precise locations cannot be indicated. Icon shifting, i.e. displaying an icon for available services in a displaced location on a map, might therefore result from the above criteria.

Preferably, upgraded service icons are used where the locale is too small to merit even the generic small-city icon at a given map scale. No upgraded service icons need to be present along with a city icon, on the other hand, because the availability of services is already implied. Due to the aforementioned city size criteria, a city that appears on a map should be large enough to offer the basic services for which service icons exist. Unlike city icons, which preferably are accompanied by municipality names on the map, upgraded service icons preferably do not show any name label.

The default values can be overridden by user input to select among alternatives in the data tables via the remote controller 18, as described above.

The position of the vehicle at any given time is input to the display controller 16 from the location system 28. Once the display controller 16 has a position of the vehicle, the display controller 16 obtains the map data for that position and the surrounding area from the map database 24 on the CD-ROM 22 via the CD-ROM drive 26 in the well-known manner. The display controller 16 then creates a map display from the map data according to the values of the variables described above, whether default values or user-entered values. For instance, one map display might be a small-scale map with cities depicted as larger or smaller dots, with all geographic areas displayed monochromatically and names in uppercase Roman embossed text embedded in the network of highways, while another display might be a large-scale map with the network of all road types, with each geographic area having a color distinct from those of its neighbors and names in mixed case plain Italic text floating above or below the roads.

The display controller 16 creates the map display using a plurality of layers, then synthesizes all the layers into a single map display and sends the single map display to the display unit 20 to be displayed in the well-known manner. The various layers contain at least geographic features, such as lakes and parks; geographic areas, such as states and cities; roads, such as interstate highways and city streets; and names, such as California and Main Street. One such set of layers, and an order in which the display controller 16 may synthesize them to create a display, is: base polygons, e.g. city boundaries; then geo-feature polygons, e.g. shopping malls and rivers; then city name labels; then local roads; then highways; then freeways; then street names; then points of interest, such as restaurants; then a guidance route, if present; then route numbers. These overlays are shown individually in FIG. 6 and overlaid on top of each other in FIGS. 7 and 8.

Regarding guidance routes, these are directions to a driver to show the driver a pathway to a particular destination. One such guidance route system is described in detail in U.S. Pat. No. 5,852,791, the disclosure of which is hereby incorporated by reference.

As the vehicle moves, the display controller 16 constantly receives new location data from the location system 28. The display controller 16 then pulls map data corresponding to the new location from the map database 24, and the cycle begins again.

Regarding colors: As noted above, a feature of the present invention is to display geographic areas using colors such that adjacent geographic areas, such as cities, counties, and the like, are not displayed using the same color. In addition to selecting colors for the cities etc., a non-trivial task is selecting a color display scheme for displaying the names of the cities etc. Several non-limiting examples of specific color display schemes are discussed in paragraphs A–H below, which correspond to views A–H in FIG. 9. Please note that these are merely examples, and given for purposes of illustration only; the invention encompasses all possible color display schemes.

A. One type of color display that may be used is variable solid color that is background-sensitive. The colors of the background (city and geo-feature) polygons are darkened, lightened, or blended with a specific label color (or a city-matched color to enhance the association with the city) to produce the solid colors. An advantage of using variable solid color is that background polygons, city name labels, and street names are all clearly identifiable.

B. Another type of color display is preset solid color (city matched). The color of the city (but not the geo-feature) polygon is darkened, lightened, or blended with a specific label color to produce the solid colors. An advantage of using preset solid color is that the association between the city and the label is clear even if the city is narrower than the label width or a large geo-feature polygon exists under the label. Another advantage is that this is a rather simple process.

C. Another type of color display is single solid color (no color matching). A specific label color is used regardless of the color of the background polygons. An advantage of using single solid color is that this is the simplest process.

D. Another type of color display is single dither color (quasi halftone). A specific label color (or a city-matched color) is used to dither with the pixels of the background polygon. An advantage of using single dither color is that the visual effect is similar to that of variable solid color (paragraph A above), without requiring heavy processing.

E. Variable highlight/shade colors (background-sensitive emboss effect). The colors of the background (city and geo-feature) polygons may be darkened and/or lightened, or blended with specific label colors (or city-matched colors to enhance the association with the city) to produce the highlight and/or the shade to create the emboss effect. An advantage of using variable highlight/shade colors is that this is the least obtrusive method to display the city name label.

F. Preset highlight/shade colors (city-matched emboss effect). The color of the city (but not the geo-feature) polygon may be darkened and/or lightened, or blended with specific label colors to produce the highlight and/or the shade to create the emboss effect. An advantage of using preset highlight/shade colors is that the association between the city and the label is clear even if the city area is narrower than the label width or a large geo-feature polygon is visible under the label.

G. Specific highlight/shade colors (no-color-matched emboss effect). Specific colors for the highlight and/or the shade are used regardless of the color of the background polygon. An advantage of using specific highlight/shade colors is that it is a relatively simple process.

H. Wider shade (deeper emboss appearance). The highlight and/or the shade are wider for a stronger emboss effect, using the color scheme of paragraph E, F, or G above. An advantage of using wider shade is that the visibility of the city name label is improved without becoming obtrusive.

Coding computer programs for the display controller 16 to perform the above-described functions is well within the skill of those of ordinary skill in the art, given the descriptions of functions herein. In the interest of brevity, therefore, details of the programs are not given herein.

6. Method

The above description of the apparatus also has described a method of use of the apparatus. As shown in FIG. 10, the method 200 comprises the following steps. Please note that the steps need not be taken in the order presented herein, as long as the various functions are performed.

In step 202, a microprocessor, an associated memory, a display controller, an operating unit or remote controller or user input device, a CD-ROM, a CD-ROM drive, a raw database, and a location system are provided. In step 204, information is stored in the raw database, the information comprising types of geographic areas; names of geographic areas; populations of geographic areas; boundaries of geographic areas; distinct visual styles for each type of geographic area; colors for each geographic area such that no adjacent geographic areas have the same color; layouts of roads; service availability for each geographic area; at least one icon for each geographic area above certain thresholds; and types of roads. In step 206, a priority is assigned to each road in the raw database based at least in part on the type of road and stored in an intermediate database from which a final map database is derived. In step 208, a first set of road display criteria is established for displaying a standard collection of roads, and a second set of criteria is established for including upgradable roads among those displayed. In step 210, roads in the intermediate database that meet these criteria are stored on the final map database. In step 212, criteria on city size thresholds are established for displaying cities with certain icons, and cities above these thresholds and their applicable icon data are stored on the final map database. In step 214, a set of criteria is established for locales with availability of certain services, and qualifying locales and their applicable service icons are stored on the final map database. This process, i.e. steps 208 through 214, may be repeated for an additional number of thresholds, e.g. for each map scale. In step 216, input is accepted from the user input device to override any or all of the default settings that determine the map display characteristics, and is stored appropriately; one such appropriate storage method is storage in a flash memory. In step 218, information is generated by the location system regarding the location of the vehicle and is accepted by the display controller. In step 220, the display controller builds a map display. In step 222, the display controller displays the map display on the display unit.

As a practitioner of ordinary skill in the art will realize, the present invention is capable of many variations. All such variations to the invention come within the scope of the present invention.

I claim:

1. A location display method in a navigation apparatus, comprising the steps of:
   (a) providing a map database;
   (b) storing information in the map database, such information comprising names of geographic areas and roads; and
   (c) displaying information from the map database; wherein the step of displaying information comprises:
   (d) creating a first display layer from the map database, the first display layer comprising roads;
   (e) creating a second display layer from the map database, the second display layer comprising names of geographic areas; and
   (f) concurrently displaying the first and second display layers, wherein the first and second display layers are movable relative to each other.

2. A location display method in a navigation apparatus, comprising the steps of:
   (a) defining a set of types of geographic areas;
   (b) defining a distinct visual style for the names of each type of geographic area;
   (c) providing a map database;
   (d) storing information in the map database, such information comprising names of geographic areas and types of geographic areas; and
   (e) displaying information from the map database, the displayed information including the name of each displayed geographic area, and for each geographic area displayed, displaying the name of the geographic area in the distinct visual style for the type of the geographic area.

3. The method of claim 2 wherein the types of geographic areas comprise municipalities, counties, and states.

4. The method of claim 2, wherein the selection of information to be displayed from the map database is governed by input from a user input device.

5. A location display method in a navigation apparatus, comprising the steps of:
   (a) providing a map database;
   (b) defining a set of types of geographic areas;
   (c) storing information in the map database regarding geographic areas, such information comprising, for each geographic area, the boundaries of the geographic area and the type of the geographic area;
   (d) assigning a color to each geographic area such that no two geographic areas that share a common boundary are assigned the same color;
   (e) for each geographic area, storing the color assigned to the geographic area in the map database; and
   (f) displaying information from the map database, the displayed information including the assigned color for each displayed geographic area.

6. The method of claim 5 wherein the types of geographic areas comprise municipalities, counties, and states.

7. A location display method in a navigation apparatus, comprising the steps of:
   (a) providing a map database;
   (b) defining a set of types of geographic areas, the types of geographic areas comprising municipalities;
   (c) storing information in the map database regarding geographic areas, such information comprising, for each geographic area, the size of the geographic area and the type of the geographic area;
   (d) for each municipality, storing an icon in the map database, wherein the icon is representative of the size of the municipality; and
   (e) displaying information from the map database, the displayed information including, for each displayed municipality, the icon for that municipality.

8. A location display method in a navigation apparatus, comprising the steps of:
   (a) providing a map database;
   (b) defining a set of types of geographic areas, the types of geographic areas comprising municipalities;
   (c) defining a set of icons of varying appearances;
   (d) assigning a municipality size range to each icon in the set;
   (e) storing information in the map database regarding geographic areas, such information comprising, for each geographic area, the size of the geographic area and the type of the geographic area;
   (f) for each municipality, storing an icon in the map database, wherein the icon is the icon from the set of icons whose municipality size range includes the size of the municipality in the map database; and
   (g) displaying information from the map database, the displayed information including, for each displayed municipality, the icon for that municipality.

9. The method of claim 8, wherein the icons in the set vary from one another by at least one characteristic selected from the group consisting of size, pattern, color, orientation, and shading.

10. A location display method in a navigation apparatus, comprising the steps of:
    (a) providing a map database;
    (b) defining a set of types of geographic areas, the types of geographic areas comprising municipalities;
    (c) storing information in the map database regarding geographic areas, such information comprising, for each geographic area, the boundaries of the geographic area and the type of the geographic area;
    (d) for each municipality, creating a boundary shape icon whose shape generally reflects the shape of the boundaries of the municipality;
    (e) for each municipality, storing the boundary shape icon in the map database; and
    (f) displaying information from the map database, the displayed information including, for each displayed municipality, an icon selected from the set of a generic icon and the boundary shape icon for that municipality; wherein the information stored in the map database further comprises, for each municipality, the size of the municipality, and wherein the method further comprises the step of setting a threshold size and wherein, for each municipality, a generic icon is displayed if the size of the municipality is less than the threshold size and the boundary shape icon is displayed if the size of the municipality is not less than the threshold size.

11. The method of claim 10 wherein the information stored in the map database further comprises the size of the municipality, and wherein the size of the boundary shape icon is generally proportional to the size of the municipality.

12. A location display method in a navigation apparatus, comprising the steps of:

(a) providing a map database;

(b) defining a set of types of geographic areas, the types of geographic areas comprising municipalities;

(c) storing information in the map database regarding geographic areas, such information comprising, for each geographic area, the road network of the geographic area and the type of the geographic area;

(d) for each municipality, creating a road network icon whose shape generally reflects the shape of the road network of the municipality;

(e) for each municipality, storing the road network icon in the map database; and (f) displaying information from the map database, the displayed information including, for each displayed municipality, an icon selected from the set of a generic icon and the road network icon for that municipality.

13. The method of claim 12 wherein the information stored in the map database further comprises the size of the municipality, and wherein the size of the road network icon is generally proportional to the size of the municipality.

14. The method of claim 12 wherein the information stored in the map database further comprises, for each municipality, the size of the municipality, and wherein the method further comprises the step of setting a threshold size, and wherein, for each municipality, a generic icon is displayed if the size of the municipality is less than the threshold size and the road network icon is displayed if the size of the municipality is not less than the threshold size.

15. A location display method in a navigation apparatus, comprising the steps of:

(a) providing a map database;

(b) defining a set of types of geographic areas, the types of geographic areas comprising municipalities;

(c) storing information in the map database regarding geographic areas, such information comprising, for each geographic area, the boundaries of the geographic area, the road network of the geographic area, and the type of the geographic area;

(d) for each municipality, creating a boundary shape icon whose shape generally reflects the shape of the boundaries of the municipality;

(e) for each municipality, storing the boundary shape icon in the map database;

(f) for each municipality, creating a road network icon whose shape generally reflects the shape of the road network of the municipality;

(g) for each municipality, storing the road network icon in the map database; and (h) displaying information from the map database, the displayed information including, for each displayed municipality, an icon selected from the set of a generic icon, the boundary shape icon for that municipality, and the road network icon for that municipality.

16. The method of claim 15 wherein the information stored in the map database further comprises the size of the municipality, and wherein the size of the boundary shape icon is generally proportional to the size of the municipality, and wherein the size of the road network icon is generally proportional to the size of the municipality.

17. The method of claim 15 wherein the information stored in the map database further comprises, for each municipality, the size of the municipality, and wherein the method further comprises the step of setting a first threshold size and a second threshold size, the second threshold size greater than the first threshold size, and wherein, for each municipality, a generic icon is displayed if the size of the municipality is less than the first threshold size, the boundary shape icon is displayed if the size of the municipality is not less than the first threshold size and is less than the second threshold size, and the road network icon is displayed if the size of the municipality is not less than the second threshold size.

18. A location display method in a navigation apparatus, comprising the steps of:

(a) providing a map database;

(b) storing information in the map database, such information comprising types of roads and at least one of the set of layouts of roads and types of areas, the types of areas comprising urban areas and rural areas;

(c) assigning a priority to each road in the map database based on the type of the road;

(d) setting a first set of road display criteria for displaying a standard collection of roads;

(e) setting a second set of road display criteria for further displaying upgradable roads;

(f) identifying each road that satisfies either the first set of road display criteria or the second set of road display criteria in the map database;

(g) determining whether upgradable roads will be displayed; and (h) displaying information from the map database, the displayed information including roads that satisfy the first set of road display criteria, the displayed information further including roads that satisfy the second set of road display criteria only if it was determined that upgradable roads would be displayed.

19. The method of claim 18 wherein roads that satisfy only the second display criteria are displayed in a visual style distinct from the visual style used to display roads that satisfy the first display criteria.

20. A location display method in a navigation apparatus, comprising the steps of:

(a) providing a map database;

(b) storing information in the map database, such information comprising at least one of the set of locales that provide services, types of roads, layouts of roads, and types or areas, the types of areas comprising urban areas and rural areas;

(c) setting a set of locale size criteria, such criteria based at least in part on at least one of the set of the population of the locale, the number of available services in the locale, and the distance to the locale from surrounding locales;

(d) setting a set of locale type criteria, such criteria based at least in part on at least one of the set of the types of available services in the locale, the types of roads that connect the locale to surrounding locales, the layout of roads that connect the locale to surrounding locales, and the types of areas in which the locale and surrounding locales exist;

(e) storing in the map database information on each locale that satisfies at least one of the set of the locale size criteria and the locale type criteria, the information comprising, for each such locale, the location of the locale and the availability of services in the locale;

(f) determining whether upgraded service icons will be displayed; and (g) displaying information from the map database, the displayed information including service icons for locales that satisfy the criteria, only if it was determined that upgraded service icons would be displayed.

21. The method of claim 20 further comprising the step of shifting the display location of available services icons to accommodate display of more important information.

22. A location display method in a navigation apparatus, comprising the steps of:

(a) providing a map database;

(b) storing information on the map database, such information comprising types of roads and at least one of the set of layouts of roads and types of areas, the types of areas comprising urban areas and rural areas;

(c) assigning a priority to each road on the map database based on the type of the road;

(d) defining an array of scale levels;

(e) defining a set of first road display criteria for displaying a standard collection of roads, one member of the set of first road display criteria corresponding to each scale level in the array of scale levels;

(f) defining a set of second road display criteria for further displaying upgradable roads, one member of the set of second road display criteria corresponding to each scale level in the array of scale levels;

(g) storing each road that satisfies either the first set of road display criteria or the second set of road display criteria in the map database;

(h) determining whether upgradable roads will be displayed;

(i) selecting a scale level to be displayed; and (j) displaying information from the map database, the displayed information including roads that satisfy the first set of road display criteria for the scale level being displayed, the displayed information further including roads that satisfy the second set of road display criteria for the scale being displayed only if it was determined that upgradable roads would be displayed.

23. A vehicle navigation apparatus, the apparatus comprising:

(a) a microprocessor;

(b) a memory associated with the microprocessor;

(c) a display controller, the display controller comprising computer software on the microprocessor;

(d) a remote controller, the remote controller providing input to the microprocessor;

(e) a display unit, the display unit driven by the display controller;

(f) a CD-ROM drive;

(g) a CD-ROM, the CD-ROM providing input to the microprocessor via the CD-ROM drive;

(h) a map database, the map database provided on the CD-ROM; and (i) a location system, the location system providing input to the microprocessor, wherein the display controller creates map displays comprising geographic areas and the names of geographic areas, such that no two geographic areas that share a common boundary are displayed using the same color.

24. The vehicle navigation apparatus of claim 23, wherein:

the map displays further comprise roads, and the names of geographic areas are scrollable independently of the roads.

25. The vehicle navigation apparatus of claim 23, wherein the appearance of the map displays is variable, the variability based on:

default values for geographic area size and road priority, and user overrides of the default values.

\* \* \* \* \*